3,282,912
α,α'-AZOALKANES

Erhard P. Benzing, Kirkwood, Mo., assignor to Monsanto Company, St. Louis, Mo., a corporation of Delaware
No Drawing. Filed Aug. 11, 1965, Ser. No. 478,991
Claims priority, application Switzerland, Dec. 22, 1958, 67,627/58; Mar. 16, 1959, 71,136/59; Aug. 29, 1960, 9,717/60
30 Claims. (Cl. 260—158)

The invention relates to new and useful α,α'-substituted azoalkanes and to a new method of preparing these azoalkanes.

This application is a continuation-in-part of copending application Serial No. 122,626, filed July 10, 1961, and Serial No. 860,102, filed December 17, 1959, and both now abandoned.

Only a relatively small number of azoalkane derivatives have been known up till now. Some α,α'-dicyanoazoalkanes have obtained considerable importance as initiators for radical chain reactions and as blowing agents for the production of polymer foams [Ziegler, Brennstoff 30, 181 (1949); Lewis, Matheson, J. Am. Chem. Soc., 71, 747 (1949); Overberger, O-Shaughnessy, Shalit, J. Am. Chem. Soc., 71, 2661 (1949), and subsequent works].

It is an object of this invention to provide a new and useful α,α'-substituted azoalkanes.

It is another object of this invention to provide a new process for making α,α'-substituted-azoalkanes from α,α'-dihaloazoalkanes.

It is another object of this invention to provide a new process for making α'-substituted-α-cyanoazoalkanes from α-cyano-α'-halogeno-azoalkanes.

It is another object of this invention to provide a new process for making α,α'-substituted azoalkane in one step from ketazines by chlorination in the presence of the anion which it is desired to substitute in the α-positions of the azoalkanes.

It is another object of this invention to provide a new process for making α'-substituted-α-cyanoazoalkanes in one step by chlorination of the addition product of a ketazine and hydrogen cyanide in the presence of the anion which it is desired to substitute in the α'-position of the azoalkane.

These and other objects of the invention will become apparent as the detailed description of the invention proceeds.

The new compounds of the invention are α,α'-substituted azoalkanes of the formula

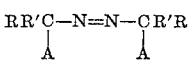

A can be any of the following radicals:

N₃, O(O)CH, O(O)CR''', S(O)CR'', S(S)CR''
O(O)COR''', S(O)COR'', S(S)COR'', OCN
OOR''', SCN and SR''. R'' is aliphatic, araliphatic, monocyclic aromatic, cycloaliphatic or heterocyclic radicals having not more than 22 carbon atoms, preferably not more than 10 carbon atoms. The terms aliphatic, araliphatic, aromatic or cycloaliphatic radical or hydrocarbon radical are used in their broader sense in that in addition to carbon and hydrogen they can contain substituents such as halogen, e.g., chlorine, nitro, cyano, etc. Likewise the term heterocyclic radical is used in its broader sense to the extent that in addition to carbon, hydrogen and heteroatoms such as oxygen, sulfur and nitrogen, it can also contain substituents such as halogen, e.g. chlorine, nitro, cyano, etc. R and R' are defined in the same manner as R'', and each R and R' can be the same or a different radical. When R and R' are taken together with the carbon atom to which they are attached cycloaliphatic radicals are formed which can contain heteroatoms and in addition other substituents as described above, and especially desirable are the cycloalkyl radicals having about 5 to 8 carbon atoms in the rings. R''' is also defined in the same manner as R'', but R''' is preferably a hydrocarbon radical and more preferably R''' is an aliphatic radical, limited to the extent that the carboxylic acids, and hydroperoxides of R''' are liquid at 40° C. When A is an OOR''' radical R''' is preferably further limited to alkyl, aralkyl and cycloalkyl radical. Furthermore, when A is a radical containing an O(O)C— alkyl radical at least R or R' is aromatic. Included among the new compounds of the invention are compounds wherein one of the A's of the above general formula is the CN radical and the other A is any one of the following radicals which are defined above, namely: OR''', N₃, O(O)CH, O(O)CR''', S(O)CR'', S(S)CR'', O(O)COR''', S(O)COR'', S(S)COR'', OCN, OOR''', SCN and SR''. When the radical A is OR''' neither R nor R' is aromatic.

In one embodiment of the process of the invention an α,α'-dihaloazoalkane, preferably an α,α'-dichloroazoalkane, is reacted with a compound able to give off the radical A in the presence of a halogen or hydrogen halide or acid binding agent and in a polar solvent. The α,α'-dihaloazoalkanes reactants especially the α,α'-dichloroazoalkanes, can be obtained, for example, by condensation of a ketone with hydrazine and the addition of halogen to the resulting ketazine [Goldschmidt, Acksteiner, Ann. 618, 173 (1958); Chem. Ber. 91, 502 (1958)]. Normally, for maximum yields the compound of A and the acid binding agent should each be present in at least twice the molar amount of the α,α'-dichloroazoalkane, except in instances such as compounds formed from bivalent metals like the alkaline earth metals. Temperatures should be kept below the decomposition temperature of the azo compound product, normally below 40° C. and preferably below 20° C. for maximum yields of the desired product since at higher temperatures competing side reactions such as decomposition of the desired product occur.

The α,α'-dichloroazoalkane reactants of the process are of the formula

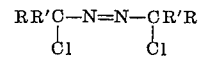

wherein R and R' are defined in the same manner as they have been hereinabove. The compounds of A which can be reacted with the α,α'-dichloroazoalkanes are compounds which will give off the radical A. This process embodiment will produce both the new compounds of the invention and compounds previously made by other processes, i.e., A for the purposes of this process is defined as any of the radicals N₃, O(O)CH, O(O)CR''', S(O)CR'', S(S)CR'', O(O)COR''', S(O)COR''
S(S)COR''
CN, OCN, OOR''', SCN and SR''. In the process R'' and R''' are defined in the same manner as they have been hereinabove. A supplemental listing of the α,α'-dichloroazoalkanes is as follows: 1,1'-dichloro-1,1'-tetraphenyl-1,1'-azomethane, 1,1'-dichloro-1,1'-dicyclohexyl-1,1'-azoethane, 1,1'-dichloro-1,1'-tetracyclohexyl-1,1'-azomethane, etc.

As halogen or hydrogen halide or acid binding agents the hydroxides, carbonates and radical A salts of ammonia, amines, alkali metals and alkaline earth metals are especially useful, and tertiary amines such as pyridine, triethylamine and the like are usable as acid binding agents. Also agents such as MgO, alkali alcoholates and the like can be used as acid-binding agents in the process of the invention. The alkaline agents serving as neutralizers of the halogen acid, originating from the reaction during the process can be added gradually during the process or all at once. The salts of other metals such as silver, lead and mercury can also be used as halogen binding agents; however, the ability of the cheaper ammonium, alkali metal and alkaline earth metal salts to react under the conditions of this invention was surprising, since only the reaction of silver salts of some aliphatic and aromatic acids with α,α'-dichloroazoalkanes in a light petroleum solution was previously known [Goldschmidt and Acksteiner, Ann., 618, 173 (1958)]. Exemplary of the halogen binding agents over and above the experimental examples are as follows: potassium hydroxide, sodium carbonate, lithium hydroxide, rubidium carbonate, potassium acetate, lithium thiophenate, calcium hydroxide, barium acetate, strontium ethylmercaptide, magnesium propionate, etc.

In another embodiment of the process of the invention providing an alternate method of making compounds of the invention, a ketazine of the formula

RR'C=N—N=CR'R and an ammonium, alkali metal, alkaline earth metal or other halogen binding metal salt of a carboxylic acid resistant to decomposition in the presence of chlorine are halogenated, preferably chlorinated, in the carboxylic acid as a solvent at a temperature of less that the decomposition temperature of the azo compound product, normally below 40° C., preferably less than 20° C., and the desired product of the formula

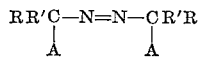

is separated from the reaction mixture. In this alternate procedure R and R' are as defined in the other process embodiment. A is the anion of a carboxylic acid, preferably an aliphatic carboxylic acid resistant to decomposition in the presence of chlorine and a liquid at reaction temperature or at 40° C. or less. The acid of A must be used as the solvent for this reaction.

Broadly speaking any compound which will give off radical A in the process of the invention is usable. More narrowly the acids, mercaptanes and thiophenols of radical A, and the ammonium, alkali metal and alkaline earth metal salts thereof are useful in the process of the invention; however, any halogen binding metal salt of A can be used. Thus in some cases the compound of A and the halogen binding agent can be the same compound. This is amply illustrated in the experimental examples below. The following is an illustrative but not meant to be limiting listing of compounds of A usable in the process of the invention. This listing is supplemental to the experimental examples. The compounds are: methylhydroperoxide, ethylhydroperoxide, cumylhydroperoxide, benzylhydroperoxide, cyclohexylhydroperoxide, tetralinhydroperoxide, formic acid, acrylic acid, acetic acid, propionic acid, butyric acid, n-valeric acid, α-methylbutyric acid, caprylic acid, pelargonic acid, caproic acid, cyclohexanecarboxylic acid, 1-cyclohexene-1-carboxylic acid, cyclopentanecarboxylic acid, α-chloropropionic acid, α-bromopropionic acid, cyclohexylacetic acid, thioacetic acid (mercaptoacetic acid), thiopropionic acid, thiobutyric acid, cyanic acid, thiocyanic acid, hydrazoic acid, hydrocyanic acid, ethyl mercaptan, thiophenol, etc. Even the longer chain aliphatic acids can be reacted in the method of the invention e.g., oleic acid, linoleic acid, linolenic acid, etc.

The following is a non-limiting listing of ketazines usable as a reactant in the alternative method of the invention: methylpropylketazine, diethylketazine, diisopropylketazine, di-n-propylketazine, di-n-butylketazine, diisobutylketazine, di-t-butylketazine, di-n-amylketazine, di-n-hexylketazine, di-n-octylketazine, n-decylmethylketazine, phenylmethylketazine, diphenylketazine, cyclohexylme-thylketazine, dicyclohexylketazine, cyclopentanone azine, cyclohexanone azine, etc.

Examples of salts of anions of A which are usable in the primary method and some of which are usable in the alternate method of the invention are: sodium formate, potassium formate, sodium acetate, potassium acetate, lithium acetate, rubidium acetate, cesium acetate, sodium chloroacetate, sodium propionate, calcium propionate, barium propionate, strontium butyrate, ammonium caprylate, sodium caproate, magnesium caproate, beryllium caproate, ammonium pelargonate, sodium phenylacetate, sodium cyclohexylacetate, sodium mercaptoacetate, ammonium thionoacetate, potassium dithioacetate, sodium cyanide, ammonium thiocyanate, ammonium cyanate, sodium mercaptide, sodium ethyl xanthogenate, sodium phenylmercaptide, sodium 2-benzothiazolylmercaptide, sodium azide, sodium thiophenolate, sodium benzoate, ammonium benzoate, etc.

Solvents for the reaction of the invention are polar solvents, preferably those miscible with water in all proportions and water dilutions thereof. Especially suitable polar solvents are the lower alkyl alcohols, especially methyl alcohol, ethyl alcohol, isopropyl alcohol and t-butyl alcohol. Also such water soluble solvents as tetrahydrofuran, dioxane, acetone, etc., are useful. When the anions of A are peroxide radicals, the most appropriate solvent is the peroxide itself or mixtures thereof with organic solvents such as esters, ketones and the like, mixtures of water with organic solvents or non-polar solvents such as hydrocarbons not being desirable. When the anions of A are carboxylic acid anions, the acids of these anions must be used as solvents. Thiocarboxylic acid are also useful as solvents when A is the anion of the acid. Suitable carboxylic acids and thiocarboxylic acids solvents are, of course, those liquid at reaction temperature such as, for example: formic acid, acrylic acid, acetic acid, propionic acid, α-chloropropionic acid, α-bromopropionic acid, caproic acid, thioacetic acid, thiobutyric acid, thiopropionic acid, isobutyric acid, thioisobutyric acid, n-valeric acid, α-methylbutyric acid, α,α-dimethylbutyric acid, α,β-dimethylbutyric acid, α-methylvaleric acid, β-methylvaleric acid, α-ethylbutyric acid, α-ethyl-α-methyl-butyric acid, δ-methyl caproic acid, acid, enanthic acid, α-ethylcaproic acid, caprylic acid, pelargonic acid, cyclohexanecarboxylic acid, 1-cyclohexene-1-carboxylic acid, cyclopentanecarboxylic acid, etc.

In addition to the products described in the experimental examples the following is a non-limiting list of products obtainable by the method of the invention:

2,2'-di-(cyclohexylperoxy)-2,2'-azopropane,
2,2'-di-(benzylperoxy)-2,2'-azopropane,
1,1'-tetra(phenyl)-1,1'-di(acetoxy)-1,1'-azomethane,
1,1'-tetra(cyclohexyl)-1,1'-di(phenylmercapto)-1,1'-azomethane,
1,1'-di(cyclohexyl)-1,1'-di(acetoxy)-1,1'-azoethane,
2,2'-di(benzoxy)-2,2'-azopropane, 2,2'-di(cyanato)-2,2'-azopropane, 1,1'-di(acetoxy)-1,1'-azocycloheptane, etc.

In another embodiment of the process of the invention, the halogen atoms of α-cyano-α'-halogeno-azoalkanes are exchanged for nucleophilic groups in the same way as the two halogen atoms of the α,α'-di-(halogeno)-azoalkanes are exchanged. The process results in the preparation of α'-substituted-α-cyanoazoalkanes which have the following general formula

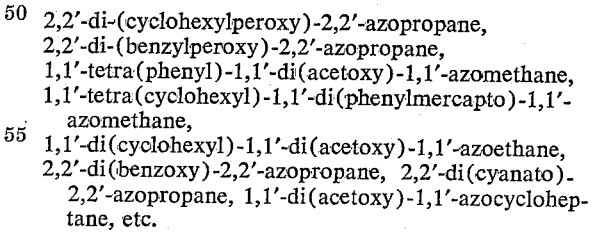

wherein R, R' and A are defined in the same manner as they have been defined hereinabove with respect to the general formula having two A substitutents including A as the CN radical, and in this process A can also be an —OR''' radical wherein R''' is as defined hereinabove. In the process, reaction conditions and process limitations are in general the same as the process using the α,α'-di-(halogeno)-azoalkane reactants, except that only one-half the molar amount of the compound able to give off A and only one-half the molar amount of the acid binding agent are needed since only one and not two chlorine atoms are replaced per mole using the α-cyano-α'-halogeno-azoalkane reactants.

The α-cyano-α-halogeno-azoalkanes serving as starting materials can be obtained, for example, by condensation of 1 mole of hydrazine with two moles of a ketone or with one mole each of two different ketones to give a symmetric or unsymmetric ketazine, addition of 1 mole of hydrogen cyanide and subsequent treatment with an equivalent amount of chlorine (Goldschmidt, Asksteiner, Ann. 618, 173 (1958)).

A modification of the process for preparing α-cyano-α'-acyloxy-azoalkane depends on the fact that the α-cyano-α'-halogeno-azoalkane is made in situ. For this the addition product of one mole of hydrogen cyanide and 1 mole of ketazine is treated with halogen, preferably chlorine in the presence of a salt of the carboxylic acid to be reacted thereby the same carboxylic acid is used as a solvent. Thus the addition products, i.e. the correspondingly substituted keto-α-cyanoalkylhydrazones are treated with chlorine in the presence of at least an equivalent amount of, for example, sodium formate and formic acid, potassium acetate in glacial acetic acid, etc. The chlorine treatment is effected by passing an equivalent of chlorine into the reaction mixture at room temperature. The reaction temperature is governed by the decomposition temperature of the α'-substituted-α-cyanoazoalkanes. The decomposition temperature of these products is in general close to or below about 80–90° C. For the peroxy substituents, the decomposition temperature is even lower, of the order of 60° C. or less.

In summary it can be said that two different cases can in principle be discerned:

(1) Compounds of the type where A represents a strongly nucleophilic group, such as, for example, —CN, —N₃, —SR'', —S(O)CR'', —S(S)CR'', —S(S)COR'', —S(O)COR'', —SCN, —OCN and the like are obtained by reaction of α,α'-di-(halogeno)-azoalkanes or α-cyano-α'-halogenoazoalkanes with salts of A in mixed water-organic solvents.

(2) Compounds of the type where A represents a weaker nucleophilic group, such as, for example

—O(O)CH, —OOR''', —O(O)CR''', —O(O)COR''' and the like, are conveniently obtained from the α,α'-di-(halogeno)-azoalkanes or α-cyano-α'-halogeno-azoalkanes using an excess of the anhydrous liquid compounds AH as solvent.

Also, with the latter azoalkane reactant, i.e. the monohalo, weak —OR''' nucleophilic groups can be substituted for the halogen atom in the same fashion. The hydrogen chloride which is formed in the reaction is bound by the addition of acid-binding agents such as alkali, MgO, alkali alcoholates, tertiary bases and the like. In the reaction of carboxylic acids, their alkali salts and, according to the solubility situation, also their ammonium or amine salts are used in an excess of the carbonic acid as a solvent.

The compounds of the invention are useful for a variety of things. They are useful as medicaments, photosensitizers, polymerization catalysts, fungicides, plant growth regulants, bactericides and as intermediates. The product of Example 9 is a rubber blowing agent and contains a catalyst for the vulcanization of rubber, and in general the compounds are useful as blowing agents for sponge rubber or plastics. Other thio substituted azoalkanes are useful in hair and wool treatment. The peroxy compounds of the invention are especially useful as polymerization catalysts for olefinic compounds, auto-oxidation and other radical-chain-reactions. As polymerization catalysts these azo compounds of the invention can be used instead of peroxides or other known azo catalysts, for example, to copolymerize styrene and methyl methacrylate, and many other monomers and comonomers. On heating either per se or dissolved in a solvent the compounds of the invention decompose releasing nitrogen and free radicals are formed which result in the formation of products of the formula

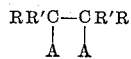

from the corresponding compounds of the invention.

The invention will be more clearly understood from the following detailed description of specific examples thereof:

EXAMPLE 1

*2,2'-di(formyloxy)-2,2'-azopropane*

To a solution of sodium formate (6.8 g.; 0.1 mole) in anhydrous formic acid (25 ml.) is added gradually a solution of 2,2'-di-(chloro)-2,2'-azopropane (4.58 g.; 0.025 mole) in acetone (17 ml.). The solutions are cooled to 0° C. After standing for 5 minutes the reaction mixture is poured into ice-water (200 ml.) and subsequently extracted three times with ether (100 ml., 50 ml., 50 ml.). The combined ether extracts are washed twice with 10% sodium carbonate solution (25 ml., 50 ml.) and once with water (50 ml.), dried over Siccon, filtered and evaporated.

The remaining oil (3.23 g.) yields on distillation under reduced pressure 1.31 g. (26%) of a yellowish oil; B. P. 38°/0.08 mm.

EXAMPLE 2

*2,2'-di-(acetoxy)-2,2'-azopropane*

Sodium acetate (18.1 g.; 0.22 mole) was dissolved in acetic acid (159 ml.). A solution of 2,2'-di-(chloro)-2,2'-azopropane (10 g.; 0.055 mole) in acetic acid (50 ml.) was added. After a short time, sodium chloride separates. Greater portions would need cooling, because the reaction is exothermic. After 3 hours the mixture is poured into water (1 liter) and left to stand for 30 minutes. The precipitated crystals are filtered off, washed with water and dried.

White needles (12.4 g.; 96%) are yielded; M.P. 103° C. The material is practically pure, it may be recrystallized from ethanol or cyclohexane.

*Analysis.*—Calcd. for $C_{10}H_{18}N_2O_4$: C, 52.16%; H, 7.88%; N, 12.17%. Found: C, 52.47%; H, 8.09%; N, 12.66.

EXAMPLE 3

*2,2'-di-(capronoxy)-2,2'-azopropane*

Sodium caproate (6.24 g.) and 2,2'-di-(chloro)-2,2'-azopropane are dissolved in caproic acid (50 ml.) and left standing for 18 hours at room temperature. The mixture is poured into an ice-cooled 8% sodium hydroxide solution (200 ml.) and more 2 n-sodium hydroxide solution is added to raise the pH to 10. After standing for some time the crystals are filtered off and dried. Yield 1.0 g. (29%); M.P. 44–45° C. By dissolving in acetone and cautiously reprecipitating with water after first filtering off a white turbidity, the analytical sample is obtained; M.P. 45–56° C.

EXAMPLE 4

*2,2'-di-(acetylthio)-2,2'-azopropane*

To a stirred and ice-cooled solution of thioacetic acid (28 g.; 0.368 mole) and sodium hydroxide (11 g.; 0.275 mole) in 80% ethyl alcohol (300 ml.) is added gradually 2,2'-di-(chloro)-2,2'-azopropane (18.3 g.; 0.1 mole). When left standing for 1 hour, the mixture is poured into ice-water (1 liter) and extracted twice with ether. After washing with water, drying with Siccon and filtering, the ether is evaporated under reduced pressure.

The oily residue (24 g.) chromatographed on Alumina and eluated by petrol ether (200 ml.) yields white crysstals (12 g.; 45.5%); M.P. 35–36° C. Recrystallization twice from aqueous methyl alcohol raised the melting point to 37.5–38° C.

*Analysis.*—Calcd. for $C_{10}H_{18}N_2S_2O_2$: C, 45.79%; H, 6.92%; N, 10.68%; S, 24.40. Found: C, 45.81%; H, 6.93%; N, 10.55%; S, 24.73%.

EXAMPLE 5

*2,2'-di-(thiocyanato)-2,2'-azopropane*

To a stirred solution of ammonium thiocyanate (31 g.; 0.4 mole) in 75% methyl alcohol (160 ml.) is added gradually 2,2'-di-(chloro)-2,2'-azopropane (14.6 g.; 0.08 mole). Soon after the substance is dissolved the crystalline reaction product separated.

After standing for 1 hour, the mixture is diluted with an equal amount of water, the crystals are filtered off, washed with water and dried. Yield 15.4 g. (85%). Recrystallization from ethyl alcohol gives pure white rhombic crystals; M.P. 98° C.

*Analysis.*—Calcd. for $C_8H_{12}N_4S_2$: C, 42.08%; H, 5.30%; N, 24.54%; S, 28.10%. Found: C, 41.41%; H, 5.14%; N, 24.26%; S, 29.31%.

EXAMPLE 6

*2,2'-di-(ethylthio)-2,2'-azopropane*

Ethylmercaptan (24.8 g.; 0.4 mole) and sodium hydroxide (12 g.; 0.3 mole) are dissolved in a mixture of water (75 ml.) and 96% ethyl alcohol (225 ml.). To the stirred and cooled mixture is added over a period of 30 minutes 2,2'-di-(chloro)-2,2'-azopropane (18.3 g.; 0.1 mole). The yellow solution containing some separated sodium chloride is stirred for an additional 30 minutes and then poured into water (1 liter) and extracted by ether.

After washing once with water, the ether solution is dried with Siccon, filtered and evaporated under the water pump. Yield 17 g. (73%) of yellow oil. Recrystallization under cooling with ice-salt-mixture gives a pure material; B.P. 65° C./0.1 mm.; M.P. 10° C.

*Analysis.*—Calcd for $C_{10}H_{22}S_2N_2$: C, 51.26%; H, 9.46%; N, 11.96%. Found: C, 51.28%; H, 9.26%; N, 11.79%.

EXAMPLE 7

*2,2'-di-(ethoxythiocarbonylthio)-2,2'-azopropane*

To a solution of sodium ethyl xanthogenate (8.64 g.; 0.06 mole) in 75% methyl alcohol (80 ml.) are added gradually with stirring at room temperature 2,2'-di-(chloro)-2,2'-azopropane (3.66 g.; 0.02 mole).

The formed yellowish crystals (5.5 g.) are filtered off. By recrystallization from methyl alcohol (40 ml.) there are obtained yellowish crystals; M.P. 66.5° C. Yield 4.88 g. (69%).

*Analysis.*—Calcd for $C_{12}H_{22}N_2O_2S_4$: C, 40.65%; H, 6.25%; N, 7.90%; S, 36.17%. Found: C, 40.43%; H, 6.05%; N, 7.73%; S, 35.25%.

EXAMPLE 8

*2,2'-di-(phenylthio)-2,2'-azopropane*

Phenylmercaptan (19.8 g.; 0.18 mole) and sodium hydroxide (5.4 g.; 0.135 mole) are dissolved in 75% ethyl alcohol (180 ml.). The mixture is stirred and cooled at 10–20° C. and 2,2'-di-(chloro)-2,2'-azopropane (11 g.; 0.06 mole) is added over a period of 45 minutes. The reaction occurred quickly; at the same rate as the chloroazo compound goes into solution so the reaction product separates. When all of the chloroazo compound is added, stirring is continued for 15 minutes and the separated crystals are recovered by filtration and dried. Yield 15.9 g. Recrystallization once from methyl alcohol gives pure white crystals (11.1 g.; 56%); M.P. 90–90.5° C. From the mother liquor an additional 2 g. (10%) can be obtained; M.P. 90–90.5° C.

EXAMPLE 9

*2,2'-di-(2-benzothiazolylthio)-2,2'-azopropane*

To a solution of 2-benzothiazolylmercaptan (13.4 g.; 0.08 mole) and sodium hydroxide (2.4 g.; 0.06 mole) in 75% acetone (60 ml.) is added gradually with stirring 2,2'-di-(chloro)-2,2'-azopropane (3.66 g.; 0.02 mole). After an hour, the reaction mixture is diluted with an equal volume of water and the separated crystals are filtered off, washed with water and dried. Recrystallization from acetone containing some water yielded yellowish crystals (5.6 g. (63%)).

The sample is recrystallized for the analysis from ethyl acetate; M.P. 109° C.

*Analysis.*—Calcd. for $C_{20}H_{20}N_4S_4$: C, 54.05%; H, 4.54%; N, 12.61%; S, 28.80%. Found: C, 53.94%; H, 4.39%; N, 12.55%; S, 29.07%.

EXAMPLE 10

*2,2'-di-(azido)-2,2'-azopropane*

To a stirred and ice-cooled solution of sodium azide (5.2 g.; 0.08 mole) in 75% methyl alcohol (80 ml.) is added gradually 2,2'-di-(chloro)-2,2'-azopropane (3.66 g.; 0.02 mole). After the addition is completed, stirring is continued over a period of 15 minutes and then, the mixture is poured into ice-water (100 ml.) and extracted three times by ether (50 ml. each).

The combined ether extracts after being dried with Siccon and filtered, are evaporated in vacuo. Yield 2.7 g. of a yellow oil which detonates violently upon warming or striking. This oil can be distilled under reduced pressure of $5 \times 10^{-3}$ mm. at 28–30°. Due to the explosive character of the product, analysis was not made.

EXAMPLE 11

*2,2'-di-(acetoxy)-2,2'-azobutane*

Processing as in Example 2 by using 2,2'-di-(chloro)-2,2'-azobutane is obtained 2,2'-di-(acetoxy)-2,2'-azobutane. Yield 77%; B.P. 118° C./12 mm.

*Analysis.*—Calcd. for $C_{12}H_{22}N_2O_4$: C, 55.97%; H, 8.58%; N, 10.85%. Found: C, 55.89%; H, 9.44%; N, 10.42%.

EXAMPLE 12

*3,3'-di-(acetoxy)-3,3'-azopentane*

Processing as in Example 2 by using 3,3'-di-(chloro)-3,3'-azopentane is obtained 3,3'-di-(acetoxy)-3,3'-azopentane. Yield 59%; M.P. 25° C.; B.P. 136° C./12 mm.

*Analysis.*—Calcd. for $C_{14}H_{26}N_2O_4$: C, 58.72%; H, 9.15%; N, 9.78%. Found: C, 58.94%; H, 9.26%; N, 10.05%.

EXAMPLE 13

*2,2'-di-(acetoxy)-4,4'-di-(methyl)-2,2'-azopentane*

Processing as in Example 2 by using 2,2'-di-(chloro)-4,4' - di - (methyl) - 2,2'-azopentane is obtained 2,2'-di-(acetoxy)-4,4'-di-(methyl)-2,2'-azopentane. Yield 35%; B.P. 92° C./0.3 mm.

*Analysis.*—Calcd. for $C_{16}H_{30}N_2O_4$: C, 61.12%; H, 9.62%; N, 8.91%. Found: C, 60.63%; H, 9.74%; N, 8.78%.

EXAMPLE 14

*1,1'-di-(acetoxy)-1,1'-di-(phenyl)-1,1'-azoethane*

To a solution of sodium acetate (3.3 g.) in glacial acetic acid (25 ml.) is added a solution of 1,1' - di-(chloro)-1,1'-di-(phenyl)-1,1'-azoethane (3.1 g.) in glacial acetic acid (45 ml.). After a short time, the precipitation of sodium chloride begins.

After standing for 2 hours the reaction mixture is poured into water (500 ml.) and the resulting emulsion is extracted twice with ether. The ether is washed with 10% sodium carbonate solution, dried over Siccon and evaporated. The remaining oil (3.1 g.; 87.5%) crystallizes partly in the cold; M.P. 109–110° C.

*Analysis.*—Calcd. for $C_{20}H_{22}O_4N_2$: C, 67.78%; H, 6.26%; N, 7.91%. Found: C, 67.73%; H, 6.57%; N, 8.29%.

EXAMPLE 15

1,1'-di-(ethoxythiocarbonylthio)-1,1'-di-(phenyl)-1,1'-azoethane

To a solution of sodium ethyl xanthogenate (1.15 g.; 0.008 mole) in 75% acetone (20 ml.) is added gradually while stirring 1,1'-di-(chloro)-1,1'-di-(phenyl)-1,1'-azoethane (0.8 g.; 0.0026 mole). After a short time the solution becomes turbid and crystals are separating.

After stirring for an additional 30 minutes the crystals are filtered off, washed with water and dried. Yield 0.9 g. (72%); M.P. 74–76° C. For the analysis, the sample was recrystallized from acetone avoiding any prolonged heating; M.P. 76–77.5° C.

*Analysis.*—Calcd. for $C_{22}H_{26}O_2N_2S_4$: C, 55.20%; H, 5.48%; N, 26.79%. Found: C, 57.43%; H, 5.71%; N, 26.26%.

EXAMPLE 16

1,1'-di-(thiocyanato)-1,1'-di-(phenyl)-1,1'-azoethane

To a solution of ammonium thiocyanate (3.04 g.; 0.04 mole) in 80% acetone (50 ml.) is added gradually while stirring 1,1' - di-(chloro)-1,1'-di-(phenyl)-1,1'-azoethane (3.07 g.; 0.01 mole). A precipitation occurs.

After 30 minutes, the reaction mixture is poured into water (250 ml.), the crystals are filtered off, washed with water and dried in the desiccator. Yield 2.7 g. (76.5%) of yellowish crystals; M.P. 110–112° C. Two recrystallizations from acetone raised the melting point to 130–131° C.

*Analysis.*—Calcd. for $C_{18}H_{16}N_4S_2$: C, 61.34%; H, 4.58%; N, 15.90%; S, 18.20%. Found: C, 61.16%; H, 4.44%; N, 16.20%; S, 18.43%.

EXAMPLE 17

1,1'-di-(acetoxy)-1,1'-azocyclopentane

Processing as in Example 2 by using 1,1'-di-(chloro)-1,1'-azocyclopentane is obtained 1,1'-di-(acetoxy)-1,1'-azocyclopentane. Yield 85%; M.P. 94.4–95° C.

*Analysis.*—Calcd. for $C_{14}H_{22}N_2O_2$: C, 59.55%; H, 7.85%; N, 9.92%. Found: C, 59.02%; H, 7.85%; N, 9.66%.

EXAMPLE 18

1,1'-di-(acetoxy)-1,1'-azocyclohexane

Processing as in Example 2 by using 1,1'-di(chloro)-1,1'-azocyclohexane is obtained 1,1'-di-(acetoxy)-1,1'-azocyclohexane. Yield 84%; M.P. 95° C.

*Analysis.*—Calcd. for $C_{16}H_{26}N_2O_2$: C, 61.91%; H, 8.44%; N, 9.03%. Found: C, 62.04%; H, 8.30%; N, 9.12%.

EXAMPLE 19

1,1'-di-(thiocyanato)1,1'-azocyclohexane

Processing as in Example 5 by using 1,1'-di-(chloro)-1,1'-azocyclohexane and 80% acetone as a solvent is obtained 1,1'-di-(thiocyanato)-1,1'-azocyclohexane. Yield 61.5%; white crystals from ethyl alcohol, M.P. 75° C.

EXAMPLE 20

1,1'-di-(phenylthio)-1,1'-azocyclohexane

To a solution of thiophenol (8.8 g.; 0.08 mole) and sodium hydroxide (2.4 g.; 0.06 mole) in a mixture of water (15 ml.) and 96% ethyl alcohol (45 ml.) is added gradually while stirring 1,1'-di-(chloro)-1,1'-azocyclohexane (5.26 g.; 0.02 mole). After an hour the reaction mixture is diluted with an equal volume of water and the separated crystals are filtered off, washed with water and dried.

Recrystallization from ethyl alcohol gives yellowish crystals. Yield 4.55 g. (55.5%); M.P. 102–103° C.

*Analysis.*—Calcd. for $C_{24}H_{30}N_2S_2$: C, 70.22%; H, 7.37%; N, 6.82%; S, 15.59%. Found: C, 70.03%; H, 7.26%; N, 7.28%; S, 15.38%.

EXAMPLE 21

2,2'-di-(cyano)-2,2'-azopropane

To sodium cyanide (3.92 g.; 0.08 mole) in 75% methyl alcohol (60 ml.) is added gradually during a period of 30 minutes 2,2'-di-(chloro)-2,2'-azopropane (3.66 g.; 0.02 mole). After an additional 30 minutes, the reaction mixture is poured into water and the precipitated crystals are filtered off. Yield 1.0 g. (30.5%); M.P. 104° C. (dec.).

EXAMPLE 22

2,2'-di-(acetoxy)-2,2'-azopropane

To a solution of dimethylketazine (11.2 g.; 0.1 mole) and sodium acetate (32.8 g.; 0.4 mole) in glacial acetic acid (300 ml.) is passed chlorine (7.1 g.; 0.1 mole) at 20° C. under exclusion of moisture. Thereby the solution becomes turbid.

After a short standing, the reaction mixture is poured into water (2 liters) and the separated crystals are filtered off. Yield 18.0 g. (78.5%); M.P. 103–103.5° C.

EXAMPLE 23

2,2'-di-(formyloxy)2,2'-azopropane

Processing as in Example 22 by using sodium formate solution in anhydrous formic acid at 0° C. is obtained 2,2'-di-(formyloxy)-2,2'-azopropane. Yield 77%; B.P. 38° C./0.08 mm.

EXAMPLE 24

1,1'-di-(propionyloxy)-1,1'-azocyclooctane

To a solution of cyclooctylidenazine (12.4 g.; 0.05 mole) and sodium propionate (19.2 g.; 0.2 mole) in propionic acid (120 ml.) is passed chlorine (3.55 g.; 0.05 mole) at 20° C. under exclusion of moisture.

After a short standing, the reaction mixture is poured into water (2 liters) and the separated crystals are filtered off. Yield 12.3 g. Recrystallized from methyl alcohol gives pure white crystals; M.P. 58.5° C.

*Analysis.*—Calcd. for $C_{22}H_{38}O_4N_2$: C, 66.93%; H, 9.55%; N, 7.28%. Found: C, 66.97%; H, 9.71%; N, 7.10%.

EXAMPLE 25

2-cyano-2'-thiocyano-2,2'-azopropane

To a solution of 2.72 g. of sodium thiocyanate (0.033 mole) in 20 ml. of aqueous methanol (75%) are added gradually 5.2 g. of 2-cyano-2'-chloro-2,2'-azopropane (0.030 mole) with stirring. Crystals precipitate in the solution after a short period. The reaction mixture is stirred for a further hour, poured into 200 ml. of ice-water, the precipitated crystals filtered off and dried. Yield 4.0 g. (=68% of the theory) of almost white crystals; M.P. 57–58° C. After recrystallization twice from cyclohexane the melting point raised to 59.5° C. The novel compound is soluble in ethanol, ethyl acetate, acetone; insoluble in light petroleum.

*Analysis.*—Calcd. for $C_8H_{12}N_4S$: C, 48.97%; H, 6.17%; N, 28.56%; S, 16.31%. Found: C, 48.86%; H, 6.04%; N, 28.72%; S, 16.04%.

EXAMPLE 26

2-cyano-2'-methoxy-2,2'-azopropane

To a solution of 0.8 g. of sodium hydroxide (0.020 mole) in 10 ml. of anhydrous methanol are added 3.46 g. of 2-cyano-2'-chloro-2,2'-azopropane (0.020 mole) and the mixture is boiled for 5 minutes. The solution soon becomes turbid because of the precipitated sodium chloride. The mixture is poured into 40 ml. of ice-water and extracted with ether. On distillation of the ether extract one obtains the novel compound. Yield 0.97 g. (=29% of the theory) of a yellow oil; B.P. 42° C./1.7 mm.

*Analysis.*—Calcd. for $C_8H_{15}N_3O$: C, 56.78%; H, 8.94%; N, 24.83%. Found: C, 56.71%; H, 8.91%; N, 24.79%.

EXAMPLE 27

2-cyano-2'-ethoxy-2,2'-azopropane

It is processed as mentioned in Example 26. The novel compound has a boiling point of 50–52° C./1.5 mm.

Analysis.—Calcd. for $C_9H_{17}N_3O$: C, 58.98%; H, 9.35%; N, 22.93%. Found: C, 62.15%; H, 9.77%; N, 20.60%.

EXAMPLE 28

2,2'-di-(cyano)-2,2'-azopropane (azo-bis-isobutyronitrile)

To a solution of 1.64 g. of sodium cyanide (0.033 mole) in 20 ml. aqueous methanol (75%) are added 5.2 g. of 2-cyano-2'-chloro-2,2'-azopropane (0.030 mole) with stirring and cooling at about room temperature. Crystals separate after a short time. After stirring for an hour the reaction mixture is poured into 200 ml. of water and the precipitated crystals are filtered off. Yield 2.6 g. (=53% of the theory); M.P. 104–105° C. (dec.).

EXAMPLE 29

2-cyano-2'-acetyloxy-2,2'-azopropane

A solution of 4.92 g. of sodium acetate (0.060 mole) in 50 ml. of glacial acetic acid is combined with a solution of 10.4 g. of 2-cyano-2'-chloro-2,2'-azopropane (0.060 mole) in 50 ml. of glacial acetic acid and heated for 1 hour at 60–70° C. Then, the reaction mixture is poured into 500 ml. of water and extracted three times with chloroform. On distillation of the chloroform extract one obtains the novel compound. Yield 10.96 g. (=92.7% of the theory) of a yellow oil; B.P. 48–51° C./0.2 mm.

Analysis.—Calcd. for $C_9H_{15}N_3O_2$: C, 54.80%; H, 7.67%; N, 21.31%. Found: C, 54.92%; H, 7.74%; N, 21.54%.

EXAMPLE 30

2-cyano-2'-formyloxy-2,2'-azopropane

It is processed as mentioned in Example 29. Yield 60% of the theory. The novel compound has a boiling point of 67–69° C./0.7 mm.

Analysis.—Calcd. for $C_8H_{13}N_3O_2$: C, 52.44%; H, 7.15%; N, 22.94%. Found: C, 52.57%; H, 7.20%; N, 23.11%.

EXAMPLE 31

2-cyano-2'-propionyloxy-2,2'-azopropane

It is processed as mentioned in Example 29. Yield 70% of the theory. The novel compound has a boiling point 58–59° C./0.2 mm.

Analysis.—Calcd. for $C_{10}H_{17}N_3O_2$: C, 56.85%; H, 8.11%; N, 19.89%. Found: C, 56.70%; H, 8.10%; N, 20.01%.

EXAMPLE 32

1-cyano-1'-azido-1,1'-azocyclohexane

To 2.6 g. of sodium azide (0.040 mole) in 8 ml. of water are added 32 ml. of acetone. Hereby the mixture separates into two phases and the salt partly precipitates again. 5.76 g. of 1-cyano-1'-chloro-1,1'-azocyclohexane are added with strong stirring and the mixture is intensively agitated for 6 hours. The solution which is now homogeneous is poured into 250 ml. of water. The crystals which separate are taken up by 150 ml. of ether and the solution is completely extracted. After the evaporation of the dried ether solution the novel compounds remain. Yield 4.6 g. (=77% of the theory) of yellowish crystals; M.P. 78–82° C. Recrystallization from ether or light petroleum gives white crystals; M.P. 84–85° C. (dec.).

EXAMPLE 33

2-cyano-2'-t-butylperoxy-2,2'-azopropane

In a solution of 3.3 g. triethylamine (0.033 mole) and 30 ml. t-butylhydroperoxide were dissolved 5.2 g. 2-cyano-2'-chloro-2,2'-azopropane (0.030 mole). The solution was kept at 0–5° C. for 45 days.

The yellow solution was then poured into 100 ml. water and extracted twice with 100 ml. ether. The ether extracts were dried with calcium sulfate and the ether evaporated under vacuum. From the residual yellow oil the excess t-butylhydroperoxide was evaporated at room temperature and under a vacuum of better than 0.1 mm. Hg. There remained 4.6 g. yellow oil, consisting predominantly of 2-cyano-2'-t-butylperoxy-2,2'-azopropane.

UV-spectrum: $\lambda_{max.}=362$; $E_{max.}=18$.

Peroxide titration with sodium iodide in acetic acid showed an equivalent weight of 174.5 compared to the theory of 110.7, indicating 63.5% purity.

Thermal decomposition at 60° showed a half-life of about 160 minutes. Seventy-four percent of the theory of nitrogen were evolved, indicating 74% purity.

EXAMPLE 34

2,2'-di-(tert.butylperoxy)-2,2'-azopropane

In 45 ml. of t-butylhydroperoxide are dissolved 3.66 g. of 2,2'-di-(chloro)-2,2'-azopropane (0.02 mole). Under cooling with ice-water are added 4.74 g. of pyridine (0.06 mole) and the reaction mixture allowed to stand at 0° C. for 24 hours. The reaction mixture is taken up in 50 ml. of light petroleum, washed twice with water and well dried with calcium sulfate. After evaporation of the light petroleum and of excess t-butylhydroperoxide at 10° C./0.3 mm., there remains 4 g. of a yellow oil, which decomposes with evolution of gas merely at room temperature. The oil contains about 75% of the desired compound as can be concluded from the following tests.

(1) *Determination of nitrogen evolved during decomposition.*—From 606 mg. of substance were evolved 40.8 ml. $N_2$ in 145 minutes at 60° C., corresponding to 77% of the theory (53 ml.).

(2) *Iodometric determination.*—The iodometric determination of the substance in glacial acetic acid gave values of 96 and 97 for the equivalent weight. On the basis of the theoretical value of 72.6 this corresponds to a yield of 75.6 or 74.8% respectively of the desired compound.

EXAMPLE 35

1,1'-di-(tert.butylperoxy)-1,1'-azocyclohexane

Using 5.26 g. of 1,1'-di-(chloro)-1,1'-azocyclohexane (0.02 mole), 4.05 g. triethylamine (0.04 mole) and 35 ml. of t-butylhydroperoxide by the same technique as described in Example 34, after 48 hours at 0°C. are obtained 6.0 g. of a yellow oil, which decomposes slowly at 50° C. with evolution of $N_2$. In a similar manner are obtained the analogous compounds with other azoalkanes and/or other hydroperoxides.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. An α,α'-substituted azoalkane of the formula

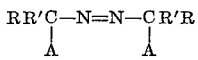

wherein A is selected from radicals of the class consisting of $N_3$, O(O)CH, O(O)CR''', S(O)CR'', S(S)CR'', OOR''', S(S)COR'', OCN, SCN, SR'', the 2-benzothiazolylthio radical and one A as CN with the other A being any one of the previously named radicals and including the OR''' radical, where R, R', and R'' are selected from the class consisting of aliphatic, araliphatic, monocyclic aromatic and cycloaliphatic hydrocarbons having not more than about 10 carbon atoms, R and R' taken together form cycloalkyl radicals, and R''' is defined in the same manner as R'', provided R and R' are aliphatic when A is OR''' and R is aromatic when A is O(O)CR'''.

2. An azoalkane of claim 1 wherein R is a monocyclic aromatic radical, R' is an alkyl radical, A is an O(O)CR''' radical and R''' is an alkyl radical.

3. An azoalkane of claim 1 wherein R and R' are alkyl radicals and A is the thiocyanato radical.

4. An azoalkane of claim 1 wherein R and R' are alkyl radicals, A is an SR'' radical and R'' is an alkyl radical.

5. An azoalkane of claim 1 wherein R and R' are alkyl radicals, A is an S(S)COR'' radical and R'' is an alkyl radical.

6. An azoalkane of claim 1 wherein R and R' are alkyl radicals and A is the 2-benzothiazolylthio radical.

7. An azoalkane of claim 1 wherein R and R' are alkyl radicals, one A is the cyano radical and the other A is an OR''' radical wherein R''' is an alkyl radical having not more than 2 carbon atoms.

8. An azoalkane of claim 1 wherein A is an OOR''' radical wherein R''' is an alkyl radical and R and R' are alkyl radicals.

9. An azoalkane of claim 1 wherein R and R' taken together with the carbon atom to which they are attached form cyclohexyl radicals and A is an OOR''' radical wherein R''' is an alkyl radical.

10. An azoalkane of claim 1 wherein R and R' are alkyl radicals and A is the O(O)CH radical.

11. A process for preparing α,α'-substituted azoalkanes of the formula

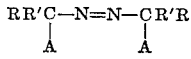

where A is selected from the class consisting of N₃, O(O)CH, O(O)CR''', S(O)CR'', S(S)CR'', S(S)COR'', CN, OCN, SCN, OOR''', SR'', the 2-benzothiazolylthio radical and OR''', where R, R' and R'' are selected from the class consisting of aliphatic, araliphatic, monocyclic aromatic and cycloaliphatic hydrocarbons having not more than about 22 carbon atoms, and R and R' taken together form cycloalkyl radicals, R''' is hydrocarbon limited to the extent that the carboxylic acids, alcohols, phenols and hydroperoxides thereof are liquid at reaction temperature, comprising reacting in the presence of a solvent selected from the class consisting of water-miscible polar solvents and water dilutions thereof, provided carboxylic acids, thiocarboxylic acids, alcohols, phenols and hydroperoxides which are liquid at reaction temperature are used as solvents only when A is the anion of said acid, alcohols, phenols and hydroperoxides, and of an acid binding agent at a temperature below the decomposition point of said azoalkanes a chloroazoalkane selected from the class consisting of compounds of the formulas

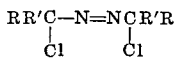

and

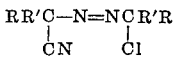

wherein R and R' are as defined hereinabove with a salt of said radical A selected from the class consisting of alkali, ammonium and amine salts wherein A is as defined hereinabove, provided A is an OR''' radical only when the other reactant is of the second type, i.e. an α-cyano-α'-chloroazoalkane and R and R' are aliphatic.

12. A process of claim 11 wherein said chloroazoalkane is an α,α'-dichloroazoalkane, R is an aliphatic radical, the salt of A and the hydrogen halide binding agent are present in at least twice the molar quantity based on said α,α'-dichloroazoalkane.

13. A process of claim 11 wherein said chloroazoalkane is an α-cyano-α'-chloroazoalkane, R is an aliphatic radical, the salt of A and the hydrogen halide binding agent are present in at least equimolar quantity based on said α-cyano-α'-chloroazoalkane.

14. A process of claim 11 wherein A is O(O)CR''', and the reaction is carried out using the carboxylic acid of A as the solvent for the reaction in the presence of a salt selected from the class consisting of alkali, ammonium and amine salts of the carboxylic acid of A and R''' is an alkyl radical.

15. A process of claim 11 wherein A is an alkylperoxy group OOR''' and the solvent is the alkylhydroperoxide and R, R' and R''' are alkyl radicals.

16. A process for preparing α,α'-substituted azoalkanes of the formulas

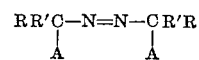

and

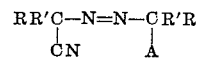

wherein A is O(O)CR''' where R''' is aliphatic limited to the extent that acids of radical A containing R''' are liquid at reaction temperature, and R and R' are selected from the class consisting of aliphatic, araliphatic, monocyclic aromatic and cycloaliphatic hydrocarbons having not more than about 22 carbon atoms and the benzothiazolylthio radical, and R and R' taken together form cycloalkyl radicals comprising reacting with chlorine in the presence of a polar solvent which is the acid of said radical A at a temperature below the decomposition point of said azoalkanes, a compound selected from the class consisiting of

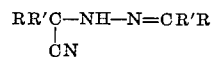

and RR'C=N—N=CR'R wherein R and R' are as defined hereinabove, and a salt of said radical A selected from the class consisting of alkali, ammonium and amine salts.

17. A process of claim 11 wherein A is the thiocyanato radical and R and R' are alkyl radicals.

18. An azoalkane of claim 1 wherein R and R' are alkyl radicals, A is S(O)CR'' and R'' is an alkyl radical.

19. An azoalkane of claim 1 wherein R and R' are alkyl radicals and A is N₃.

20. An azoalkane of claim 1 wherein R is a monocylic aromatic radical, R' is an alkyl radical, A is S(S)COR'' and R'' is an alkyl radical.

21. An azoalkane of claim 1 wherein R is a monocylic aromatic radical, R' is an alkyl radical and A is the thiocyanato radical.

22. An azoalkane of claim 1 wherein R and R' taken together form a cycloalkyl radical and A is the thiocyanato radical.

23. An azoalkane of claim 1 wherein R and R' taken together from a cycloalkyl radical, A is SR'' and R'' is a monocylic aromatic radical.

24. An azoalkane of claim 1 wherein R and R' are alkyl radicals, one A is the cyano radical and the other A is the thiocyanato radical.

25. An azoalkane of claim 1 wherein R and R' are alkyl radicals, one A is the cyano radical and the other A is O(O)CR''' wherein R''' is an alkyl radical.

26. An azoalkane of claim 1 wherein R and R' are alkyl radicals, one A is the cyano radical and the other A is O(O)CH.

27. An azoalkane of claim 1 wherein R and R' taken together form a cycloalkyl radical, one A is the cyano radical and the other A is the N₃ radical.

28. An azoalkane of claim 1 wherein R and R' are alkyl radicals, one A is the cyano radical and the other A is OOR''' wherein R''' is an alkyl radical.

29. An azoalkane of claim 1 wherein R and R' are methyl and A is the thiocyanato radical.

30. A process of claim 11 wherein R and R' are methyl, A is the thiocyanato radical, and the salt of A is ammonium thiocyanate.

No references cited.

CHARLES B. PARKER, *Primary Examiner.*
DONALD M. PAPUGA, *Assistant Examiner.*